(12) United States Patent
Kang

(10) Patent No.: US 10,176,750 B2
(45) Date of Patent: Jan. 8, 2019

(54) DISPLAY DEVICE

(71) Applicant: Samsung Electronics Co., Ltd., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/418,288

(22) Filed: Jan. 27, 2017

(65) Prior Publication Data

US 2017/0287389 A1 Oct. 5, 2017

(30) Foreign Application Priority Data

Apr. 1, 2016 (KR) .................. 10-2016-0040300

(51) Int. Cl.
*G09G 3/32* (2016.01)
*G02F 1/1335* (2006.01)

(52) U.S. Cl.
CPC ......... *G09G 3/32* (2013.01); *G02F 1/133621* (2013.01); *G02F 2001/133628* (2013.01); *G09G 2300/0452* (2013.01); *G09G 2310/08* (2013.01); *G09G 2320/041* (2013.01)

(58) Field of Classification Search
None
See application file for complete search history.

(56) References Cited

U.S. PATENT DOCUMENTS

| 5,193,200 | A | * | 3/1993 | Asprey | G06F 3/0227 345/168 |
| 7,468,723 | B1 | | 12/2008 | Collins | |
| 7,679,295 | B1 | | 3/2010 | Collins | |
| 8,723,427 | B2 | | 5/2014 | Collins et al. | |
| 8,810,151 | B2 | | 8/2014 | Underwood et al. | |
| 9,179,509 | B2 | | 11/2015 | Godbole et al. | |
| 2002/0151213 | A1 | * | 10/2002 | Aoki | B60R 16/0215 439/502 |
| 2004/0233663 | A1 | | 11/2004 | Emslie et al. | |
| 2006/0082529 | A1 | * | 4/2006 | Oyama | G09G 3/3406 345/82 |
| 2007/0001941 | A1 | * | 1/2007 | Umezaki | G09G 3/006 345/77 |
| 2013/0187570 | A1 | | 7/2013 | Oshima et al. | |

FOREIGN PATENT DOCUMENTS

| JP | 2012-129129 | 7/2012 |
| JP | 2013-149479 | 8/2013 |
| KR | 10-2004-0100858 | 12/2004 |
| KR | 10-2006-0124354 | 12/2006 |

* cited by examiner

*Primary Examiner* — Carl Adams
(74) *Attorney, Agent, or Firm* — Staas & Halsey LLP

(57) ABSTRACT

A display device is provided, which includes a light emitter including an LED array; a current detector configured to detect current that flows through the LED array; a driving circuit configured to provide constant current to the LED array; and a cable including a first line configured to provide the constant current that is provided from the driving circuit to the light emitter, and a second line configured to connect a node, to which the current detector and the driving circuit are commonly connected, and the driving circuit to each other.

12 Claims, 6 Drawing Sheets

DISPLAY DEVICE

CROSS-REFERENCE TO RELATED APPLICATIONS

This application claims priority from Korean Patent Application No. 10-2016-0040300 filed on Apr. 1, 2016 in the Korean Intellectual Property Office, the disclosure of which is incorporated herein by reference in its entirety.

BACKGROUND

1. Field

The present disclosure relates to a display device, and more particularly, to a display device, which can improve the structure of an LED backlight to reduce heat generation of an LED TV and to save the manufacturing cost of an LED TV.

2. Description of the Related Art

In general, a video display device is used to display a video signal that is input from a video card or the like. Such a video display device may be divided into a self-luminous type and a non-luminous type. For example, a video display device, such as OLED or PDP, is a self-luminous type, and displays an image through emission of light by itself. In contrast, LCD is obtained by injecting liquid crystals having intermediate property between solid and liquid between two thin glass boards, and displays an image in a manner that it changes an alignment of liquid crystal molecules to generate contrast when a power is supplied thereto. As a result, the LCD is of a non-luminance type, and thus is unable to operate if there is no rear surface light source. Accordingly, there is a need for a backlight light source in the form of a surface light source, which can maintain the whole screen with uniform brightness.

Such a backlight light source may include, for example, a plurality of LEDs, which may be arranged at edge portions of a panel or on the whole rear surface of the panel to provide light as a surface light source. In general, a backlight light source in which LEDs are arranged at edge portions of the panel is called an edge type, and a backlight light source in which LEDs are arranged on the whole rear surface of the panel is called a direct type.

A typical video display device includes a driver for driving the backlight light source, and such a driver may include a switching type power circuit that performs on/off driving of the backlight light source. Further, LED modules, each of which includes a driver and an LED element, are connected to one another by drive cables.

However, recently, as the video display device has been gradually large-sized, the number of LED modules is also increased. Further, since an LED module is divided into a plurality of blocks to be driven for high picture quality local dimming, the number of drive cables is gradually increased to cause the manufacturing cost of the video display device also to be increased.

Further, as the number of LED modules is increased with the large-scaled video display device, the power of the driver for driving the LED modules is also increased to cause a big problem with heat generation.

SUMMARY

Exemplary embodiments of the present disclosure overcome the above disadvantages and other disadvantages not described above, and provide a display device, which can improve the structure of an LED backlight to reduce heat generation of an LED TV and to save the manufacturing cost.

According to an aspect of the present disclosure, a display device includes a light emitter including an LED array; a current detector configured to detect current that flows through the LED array; a driving circuit configured to provide constant current to the LED array; and a cable including a first line configured to provide the constant current that is provided from the driving circuit to the light emitter, and a second line configured to connect a node, to which the current detector and the driving circuit are commonly connected, and the driving circuit to each other.

The first line and the second line may be of different types.

The first line and the second line may be of the different types in which any one of a line width and a shape differs from each other.

The current detector may be formed on a board on which the LED array is arranged.

The current detector may include a resistor having one end that is connected to one end of the LED array and the other end that is connected to a system ground.

In the case where the current detector is formed on a board that is different from the board on which the LED array is arranged, the cable may further include a third line configured to connect the current detector and the LED array to each other.

The current detector may include a resistor having one end that is connected to one end of the LED array through the third line and is connected to the driving circuit through the second line, and the other end that is connected to a system ground.

The third line may have the same shape as the shape of the first line, and may have a different shape from the shape of the second line.

The driving circuit may include a controller configured to control the constant current that is applied to the light emitter; and a stabilizer connected between a supply voltage terminal and the controller to stabilize an operation of the controller during an abnormal operation of the second line.

The stabilizer may include a pull-up resistor.

The second line may include a flexible flat cable (FFC).

The display device according to the aspect of the present disclosure may further include a lower cover provided with a first board on which the light emitter is formed, and the first board and a second board on which the driving circuit is formed are commonly grounded to the lower cover.

The light emitter may generate white light through driving of at least one of red (R), green (G), blue (B), and white (W) light emitting elements as the LED array.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
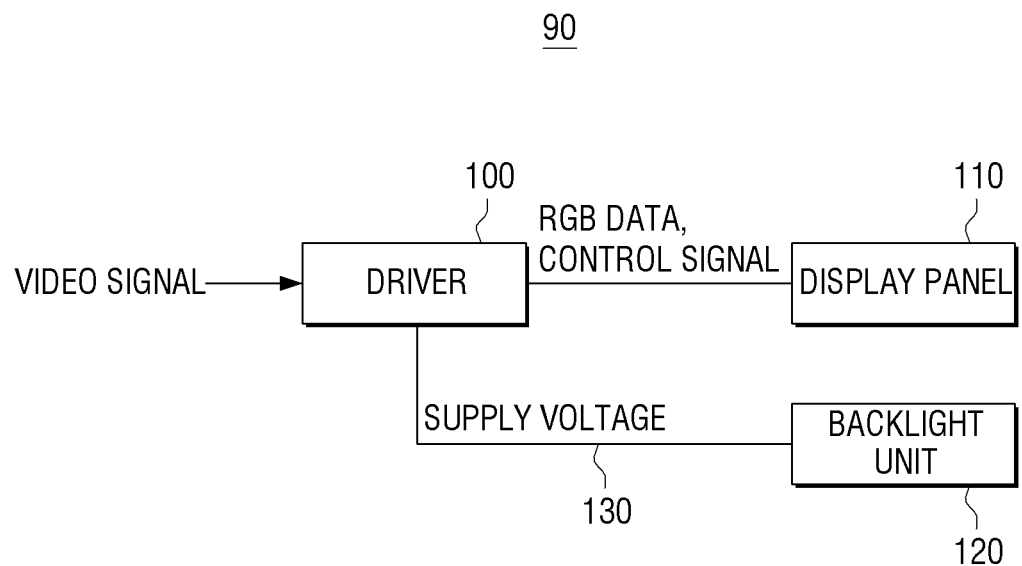
FIG. 1 is a block diagram illustrating the configuration of a display device according to a first embodiment of the present disclosure.

Reference will now be made in detail to the embodiments, examples of which are illustrated in the accompanying drawings, wherein like reference numerals refer to the like elements throughout. The embodiments are described below to explain the present invention by referring to the figures.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

Hereinafter, exemplary embodiments of the present disclosure will be described in detail with reference to the accompanying drawings.

FIG. 1 is a block diagram illustrating the configuration of a display device according to a first embodiment of the present disclosure.

As illustrated in FIG. 1, a display device 90 according to the first embodiment of the present disclosure includes a part or the whole of a driver 100, a display panel 110, and a backlight unit 120. The display device 90 may further include a power line 130 that connects the driver 100 and the backlight unit 120 to each other.

Here, the term "includes a part or the whole" means that a video processor 100 is integrally configured (e.g., mounted in COG (Chip On Glass) type) onto the display panel 110, and to help full understanding of the present disclosure, explanation will be made on the assumption that the display device 90 includes the whole of the above-described constituent elements.

First, the driver 100 controls the overall operation of the display device 90. In other words, if the display device 90 is turned on, the driver 100 controls the backlight unit 120 to provide light to the display panel 110, so that an input video signal is output through the display panel 110. Here, the video signal may include a video signal, an audio signal, and additional information such as caption information.

The driver 100 according to an embodiment of the present disclosure may include a video processor that is related to video implementation on the display panel 110 and a lamp driver configured to control the backlight unit 120. Here, the video processor may be configured on a first board, and the lamp driver may be provided on a second board. The display device 90 includes the backlight unit 120 having LED modules formed, for example, on an external case of an iron (Fe) material or a lower cover, the display panel 110 arranged on the upper side of the backlight unit 120, and an upper cover surrounding an upper edge of the display panel 110. Under the assumption of the above-described configuration, the driver 100 is assembled onto a rear surface of the lower cover, in other words, onto the lower cover on the opposite side of the LED module. Here, the LED module has a string shape in which a plurality of light emitting elements are connected in series on the board.

In the above-described configuration according to an embodiment of the present disclosure, the LED modules that constitute the backlight unit 120 and the lamp driver are electrically connected to each other through the power line 130, that is, a separate cable. In an embodiment of the present disclosure, the lamp driver controls the LED light emitting elements that constitute the LED module in a constant current method, and thus applies current through the first line of the cable. Further, the lamp driver senses whether rated current flows through the LED light emitting elements by means of a current detector. For this, the current detector is configured on one side of the light emitting element. In an embodiment of the present disclosure, it is preferable that the current detector is formed in an area that is adjacent to the LED module. The current detector as described above is connected to the lamp driver through a second line that constitutes the power line 130, and the lamp driver adjusts the current by performing PWM control of the LED module in accordance with a voltage that is detected through the current detector. In an embodiment of the present disclosure, the current detector may include a resistor that is connected between one side of the light emitting element (or LED array) and ground.

In the power line 130 according to an embodiment of the present disclosure, since the current detector is formed in the area that is adjacent to the LED module (in consideration of the heat generation problem), the line type of the second line for receiving a feedback of a voltage from the LED module is different from the line type of the first line. Here, the term "different line type" means that a core through which current flows has a different type, and for example, at least one of a line width and a shape may differ from each other. For example, if the first line is circular, the second line is also kept circular in the same manner, but the line width, that is, the thickness, of the second line may be thinner than the line width of the first line. Further, although the first line is circular, the second line may be in the shape of a flexible flat cable (FFC) so far as the purpose according to an embodiment of the present disclosure (e.g., to save the manufacturing cost while normally operating the circuit) can be achieved. The power line can be in various types, and thus is not specially limited to the above-described contents. For example, in order to improve the heat generation problem only, the first line and the second line may have the same type.

The display panel 110 displays an image on a screen under the control of the driver 100. In an embodiment of the present disclosure, the display panel 110 includes a liquid crystal layer, but existence/nonexistence of a color filter may not be considered. That is, in an embodiment of the present disclosure, it is also possible to apply a liquid crystal panel with no color filter. However, in the case of the liquid crystal panel having no color filter, it is preferable that the backlight unit 120 includes red (R), green (G), and blue (B) light emitting elements, for example, red (R), green (G), and blue (B) LEDs. In the case of the display panel having no color filter, an image is displayed in a manner that when an R-frame image is implemented on the display panel 110, only R light emitting elements are turned on, and when a G-frame image is implemented on the display panel 110, the turned-on R light emitting elements are turned off and then the G light emitting elements are turned on again.

As described above, the backlight unit 120 may include at least one of R, G, B, and W light emitting elements, and may provide white light or may sequentially provide R, G, and B lights. If the display panel 110 does not include a color filter, it is preferable that the backlight unit 120 is configured to sequentially provide the R, G, and B lights. Further, in an embodiment of the present disclosure, the backlight unit 120 may be divided into a plurality of regions to be dividedly driven. In other words, it becomes possible to perform local control for the respective regions, that is, local dimming control of the light emitting elements. In the case of configuring the backlight unit 120 so that the display device 90 performs the local dimming control according to an embodiment of the present disclosure, the cost of the cable that connects the LED module and the lamp driver of the backlight unit 120 can be greatly saved.

Hereinafter, the driver 100, the display panel 110, and the backlight unit 120 as illustrated in FIG. 1 will be described in more detail.

Figure 2:
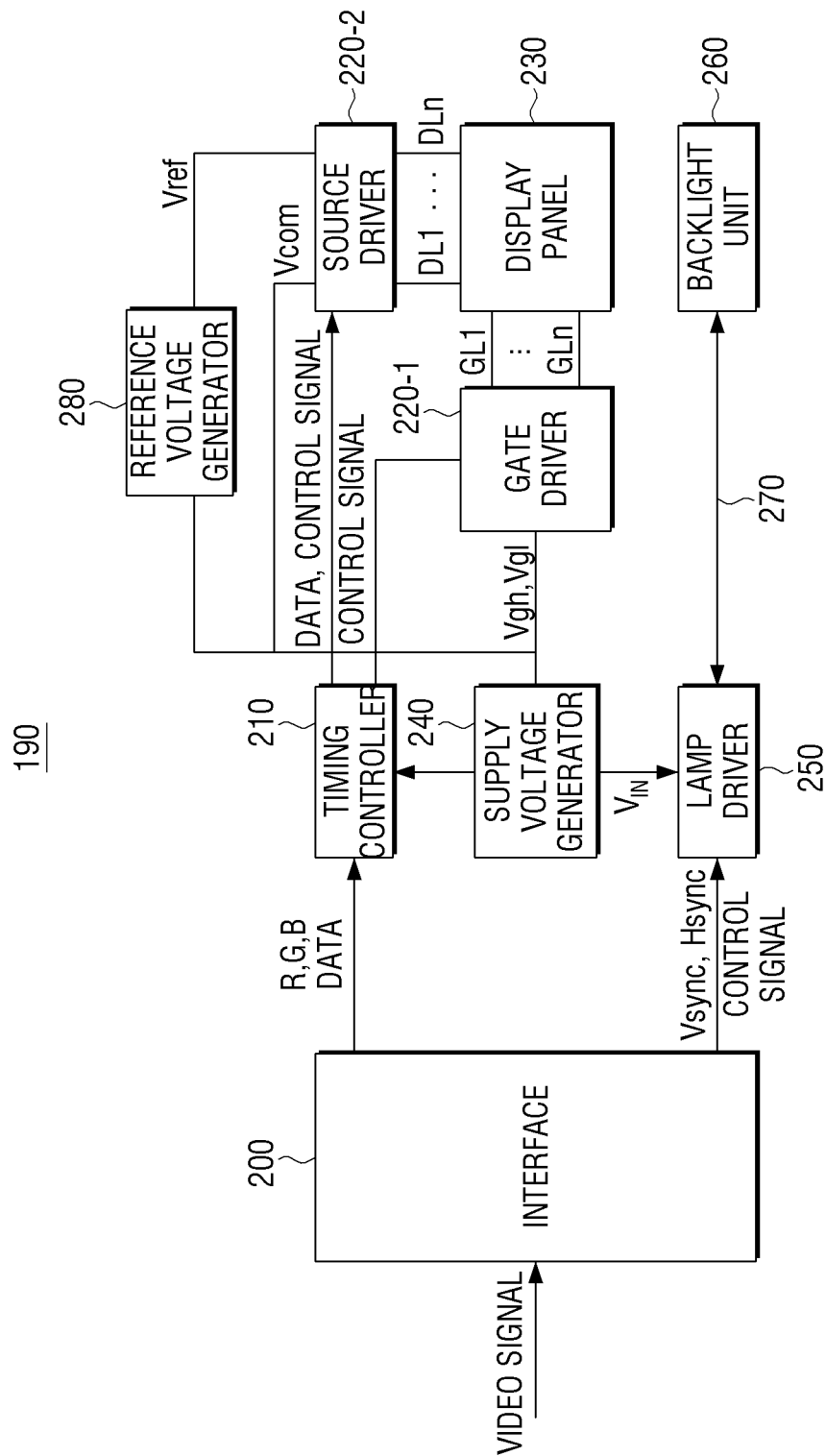
FIG. 2 is a block diagram illustrating the configuration of a display device according to a second embodiment of the present disclosure.

FIG. 2 is a block diagram illustrating the configuration of a display device according to a second embodiment of the present disclosure.

As illustrated in FIG. 2, a display device 190 according to a second embodiment of the present disclosure includes a part or the whole of an interface 200, a timing controller 210, gate and source drivers 220-1 and 220-2, a display panel 230, a supply voltage generator 240, a lamp driver 250, a backlight unit 260, and a reference voltage generator 280.

Here, the term "includes a part or the whole" means that partial constituent elements such as the lamp driver 250 and the backlight unit 260 may be integrally constructed to form a backlight unit. To help full understanding of the present disclosure, explanation will be made on the assumption that the display device 190 includes the whole of the above-described elements.

The interface 200 is a video board such as a graphic card, and serves to properly convert video data that is input from an outside to match the resolution of the video display device to output the converted video data. Here, the video data may be, for example, R, G, and B video data of 8 bits, and the interface 200 generates a clock signal DCLK that matches the resolution of the video display device and control signals, such as vertical and horizontal sync signals Vsync and Hsync. Further, the interface 200 provides the video data to the timing controller 210, and provides the vertical/horizontal sync signals to the lamp driver 250, so that when an image is implemented on the display panel 230, the backlight unit 260 may be turned on or off in synchronization with the video data.

Further, the interface 200 may include a tuner receiving a specific broadcasting program that is provided from an external broadcasting station, a demodulator demodulating the video signal input through the tuner, a demultiplexer separating the demodulated video signal into video/audio data and additional information, a decoder decoding the separated video/audio data, and an audio processor converting the decoded audio data into a format that matches a speaker.

Further, the interface 200 may further include a video analyzer (not illustrated). Here, the video analyzer may determine the brightness through analysis of the input video signal. Further, the interface 200 may generate a dimming signal in accordance with the brightness, for example, the darkness level, with respect to a continuous unit frame, and may provide the dimming signal to the lamp driver 250 as a control signal. Through this, the lamp driver 250 could perform dimming control of the backlight unit 260. It is preferable that the video analyzer is configured to be included in the interface 200, but it may be configured separately from the interface 200. An embodiment of the present disclosure is not specially limited to the above-described contents.

The timing controller 210 provides the video data that is provided from the interface 200 to the source driver 220-2, and controls the video data output from the source driver 220-2 using a timing signal, so that unit frame image is sequentially implemented on the display panel 230. Further, the timing controller 210 controls the gate driver 220-1 to provide a gate on/off voltage that is provided from the supply voltage generator 240 to the display panel 230 by horizontal lines. For example, if a gate voltage is applied to a gate line GL1, the timing controller 210 controls the source driver 220-2 to apply the video data that corresponds to a first horizontal line portion. Further, the timing controller 210 turns on gate line 2 GL2 and turns off the first gate line at the same time so that the video data that corresponds to the second horizontal line portion is applied from the source driver 220-2 to the display panel 230. In this manner, the unit frame image is displayed on the whole screen of the display panel 230.

The gate driver 220-1 receives the gate-on/off voltage Bgh/Vgl that is provided from the supply voltage generator 240, and applies the corresponding voltage to the display panel 230 under the control of the timing controller 210. The gate-on voltage Vgh is provided in order from gate line 1 GL1 to gate line N GLn when the image is implemented on the display panel 230.

The source driver 220-2 converts the video data that is provided in series from the timing controller 210 into video data in parallel, converts digital data into an analog voltage, and provides the video data that corresponds to one horizontal line portion to the display panel 230 simultaneously and sequentially. Further, the source driver 220-2 may receive a common voltage Vcom that is generated from the supply voltage generator 240 and a reference voltage (or gamma voltage) Vref that is provided from the reference voltage generator 280. Here, the common voltage Vcom is provided to a common electrode of the display panel 230, and the reference voltage Vref is provided to a D/A converter in the source driver 220-2 to be used when grayscales of a color image are expressed. In other words, the video data that is provided from the timing controller 210 may be provided to the D/A converter, and digital information of the video data that is provided to the D/A converter is converted into an analog voltage that can express the grayscales of the color to be provided to the display panel 230.

The display panel 230 is composed of, for example, a first board, a second board, and a liquid crystal layer interposed between the first and second boards. On the first board, a plurality of gate lines GL1 to GLn and data lines DL1 to DLn which cross each other to define a pixel region are formed, and a pixel electrode is formed on the pixel region on which the gate and data lines cross each other. Further, on one portion of the pixel region, more accurately, at the corner of the pixel region, thin film transistors (TFTs) are formed. When the TFTs are turned on, liquid crystals are twisted, as much as a difference between voltages that are applied to the pixel electrode of the first board and the common electrode of the second board, to transmit light that is provided from the backlight unit 260.

Further, the display panel 230 may include the gate driver 220-1 and the source driver 220-2 that are formed on the outline of a display on which an image is implemented. The display panel 230 operates the gate driver 220-1 and the source driver 220-2 by means of a timing control signal that is provided from the timing controller 210, and displays R, G, and B data that is provided through the source driver 220-2 on the display to implement the image thereon.

The supply voltage generator 240 receives a commercial voltage, that is, AC voltage of 110V or 220V, from the outside, and generates and outputs DC voltages having various levels. For example, the supply voltage generator 240 may generate and provide a voltage of DC 15V for the gate driver 220-1 as the gate-on voltage Vgh, may generate and provide a voltage of DC 14V or DC 24V for the lamp driver 250 as the supply voltage Vcc, and may generate and provide a voltage of DC 12V for the timing controller 210.

The lamp driver 250 may convert the voltage that is provided from the supply voltage generator 240 and may provide the converted voltage to the backlight unit 260. Here, the term "convert" means both conversion of the analog type DC voltage level and PWM driving. Further, the lamp driver 250 may simultaneously or dividedly drive R, G, and B LEDs that constitute the backlight unit 260. Further, the lamp driver 250 may include a feedback circuit (or LED driving circuit) that controls feedback of the LED driving current so that uniform light can be provided from the R, G, and B LEDs of the backlight unit 260, and such a feedback circuit may be called a switching power circuit.

The backlight unit 260 is composed of R, G, and B LEDs. For example, the backlight unit 260 may be constructed in any type, such as a direction type in which the R, G, and B LEDs are arranged on the whole lower end of the display panel 230 or an edge type in which the R, G, and B LEDs are arranged at edges of the display panel 230. However, in an embodiment of the present disclosure, the backlight unit 260 may operate so that the light emitting elements are simultaneously turned on/off or are dividedly driven by blocks under the control of the lamp driver 250. Further, the plurality of LEDs may be in various types, such as they may be connected in series to each other, or may be connected in parallel to each other.

The power line 270 connects the lamp driver 250 and the backlight unit 260 to each other. Since this feature has been fully described through the power line 130 of FIG. 1, further explanation thereof will be omitted.

The reference voltage generator 280 may be called a gamma voltage generator, and if a voltage of, for example, DC 10V, is provided from the supply voltage generator 240, the reference voltage generator 280 may divide the provided voltage into a plurality of voltages through dividing resistors to provide the divided voltages to the source driver 220-2. Through this, the source driver 220-2 may further divide the provided voltages so as to express 256 grayscales of R, G, and B data.

Figure 3:
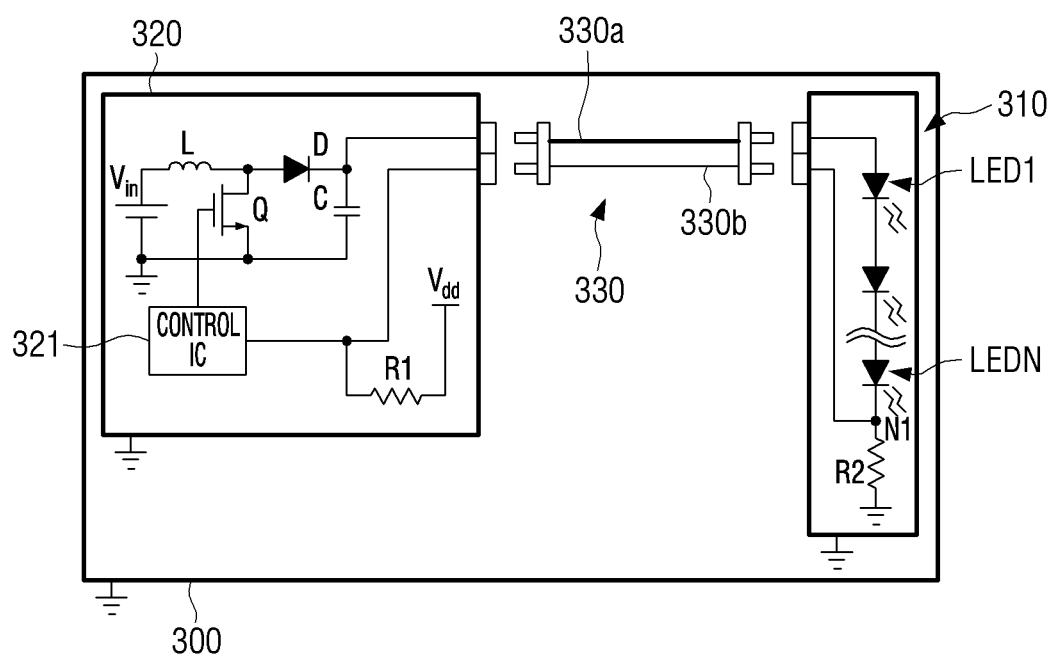
FIG. 3 is a circuit diagram of a display device according to a third embodiment of the present disclosure.
Figure 4A:
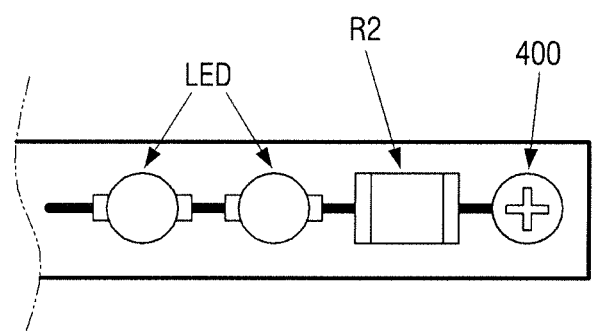
FIGS. 4A and 4B are diagrams exemplarily illustrating a type in which an LED module of FIG. 3 is fixed to an external case.
Figure 4B:
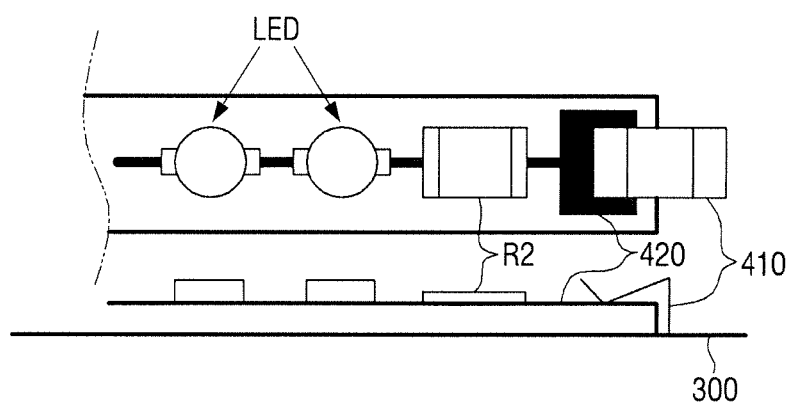

FIG. 3 is a circuit diagram of a display device according to a third embodiment of the present disclosure, and FIGS. 4A and 4B are diagrams exemplarily illustrating a type in which an LED module of FIG. 3 is fixed to an external case.

As illustrated in FIG. 3, a display device 290 according to a third embodiment of the present disclosure includes an external case 300, an LED module (or LED array) 310, an LED driver 320, and a power line (or cable) 330.

Here, the LED module 310 is provided on one side (e.g., front surface or an inside) of the external case 300. The LED module 310 includes a plurality of LEDs that are connected in series to each other in the form of a string on a first board, for example, a printed circuit board (PCB), and a current detection resistor R2 that is connected between one side of the LEDs and ground as a current detector. In this case, among the plurality of LEDs, an anode of the LED LED, that is positioned at an edge of one side is connected to a first line 330a of the power line 330, and a cathode of the N-th LED $LED_N$ that is positioned at an edge of the other side is connected to a second line 330b of the power line 330.

It is preferable that the LED driver 320 is formed on a second board, and although not clearly illustrated in the drawing, the LED driver 320 is provided on the other side (e.g., rear surface) of the external case 300. The LED driver 320 includes a boost circuit that provides current to the LED module 310 using the supply voltage that is provided from the supply voltage generator 240 of FIG. 2. Further, the LED driver 320 further includes, for example, a pull-up resistor R1as a stabilizer for stabilizing the operation of the boost circuit when the first line 330a and/or the second line 330b of the power line 330 break down. The pull-up resistor R1 is connected between the control circuit and the supply voltage terminal Vdd.

An IC type control circuit 321 detects both-end voltage of the current detection resistor R2 through the second line 330b of the power line 330 as a feedback voltage, and based on this, the control circuit 321 compares the both-end voltage with a reference voltage (or reference current) that is input from an outside to the control circuit 320, and adjusts a duty-on time of a switching element Q according to a voltage difference that is obtained through the above-described comparison to perform constant current control of the LED module 310. That is, the control circuit 321 operates to provide constant current. If the second line 330b that is a feedback path breaks down, the control circuit 321 performs stable operation through the pull-up resistor R1.

The power line 330 connects the LED module 310 and the LED driver 320 to each other. Although not separately illustrated in the drawing, the first board and the second board may have connectors for connecting the power line 330, and the power line 330 may be connected through the connectors. A current detection resistor R2 formed in the LED module 310 may have a quite small resistance value that corresponds to, for example, 0.2Ω, and thus the second line 330b that receives a feedback of such a fine voltage may have a shape that is different from the shape of the first line 330a. Since other detailed contents have been fully described, further detailed explanation thereof will be omitted.

In summary again, in the case of a boost LED driving circuit, current that flows through the LED flows to ground of the system through the current detection resistor R2. In this case, for a stable operation and safety of the system, an external case (e.g., lower cover of a backlight) and all circuitries share a common ground, and if the current that flows out through the LED is made to pass to the ground through the current detection resistor R2, there is no great difficulty in forming the structure of the power line 330 as illustrated in FIG. 3. A voltage that appears at the current detection resistor R2 should be connected to the control IC 321 that is an LED driving circuit through a feedback path that is formed through the cable, that is, the power line 330, and the feedback path, that is, the second line 330b, only serves to transfer the voltage that is detected through the current detection resistor R2 to the control IC 321 in a state where almost no LED current flows through the second line 330*b*. Accordingly, it becomes possible to design the cable, that is, the line, for the feedback path with a minimum thickness.

In the case where the feedback path is damaged due to cable breakdown or contact inferiority of the connector, the voltage that is input to the control IC 321 is not sensed to cause the output of the LED driving circuit to be increased, and thus the LED may be damaged due to overcurrent. In order to solve this problem, the pull-up resistor R1 to the supply voltage Vdd serves as a protection circuit that actually stops the operation of the LED driving circuit through increasing of the voltage that is input to the control IC 321.

As illustrated in FIG. 3, in the case where the current detection resistor R2 is packaged in the LED module 310, the LED module 310 may be grounded using a screw 400 as shown in FIG. 4A or a clip 410 as shown in FIG. 4B to make the current that flows out of the current detection resistor R2 return to the ground. More specifically, referring to FIG. 4B, the clip 410 is fixed to the external case 300, and a copper thin film 420 that is a thin film made of a copper material is formed on the board of the LED module 310. When the LED module 310 is assembled, the clip 410 and the copper thin film 420 come in contact with each other. In an embodiment of the present disclosure, any method can be used so far as it shows the same effect as described above.

Figure 5:
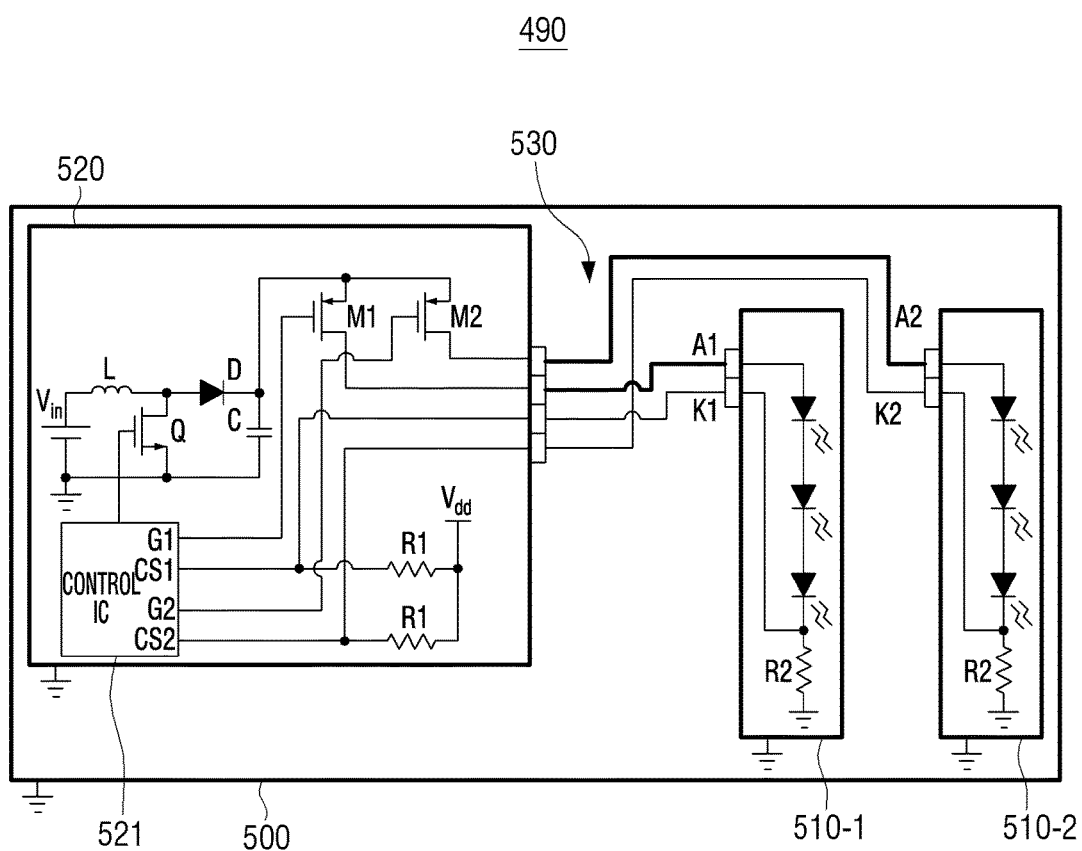
FIG. 5 is a block diagram illustrating the configuration of a display device according to a fourth embodiment of the present disclosure.

FIG. 5 is a block diagram illustrating the configuration of a display device according to a fourth embodiment of the present disclosure.

As illustrated in FIG. 5, a display device 490 according to a fourth embodiment of the present disclosure includes an external case 500, a plurality of LED modules 510-1 to 510-2, an LED driving circuit (driver) 520, and a power line 530.

As compared with the display device 290 of FIG. 3, the display device 490 of FIG. 5 may be implemented in the same manner as that of FIG. 3 even in the case where several LED modules 510-1 and 510-2 are independently driven. Further, the LED driving circuit 520 may not necessarily be the boost circuit as illustrated in FIG. 3, and may be applicable to all circuits in which the LED current passes to the ground through the current detection resistor R2. FIG. 5 shows an example in which current detection resistors R2 are respectively packaged in the LED modules 510-1 and 510-2 that are driven by the linear type LED driving circuit 520.

Except for such points, the display device 490 of FIG. 5 is not greatly different from the display device 290 of FIG. 3, and thus the detailed explanation of the same contents will be omitted.

Figure 6:
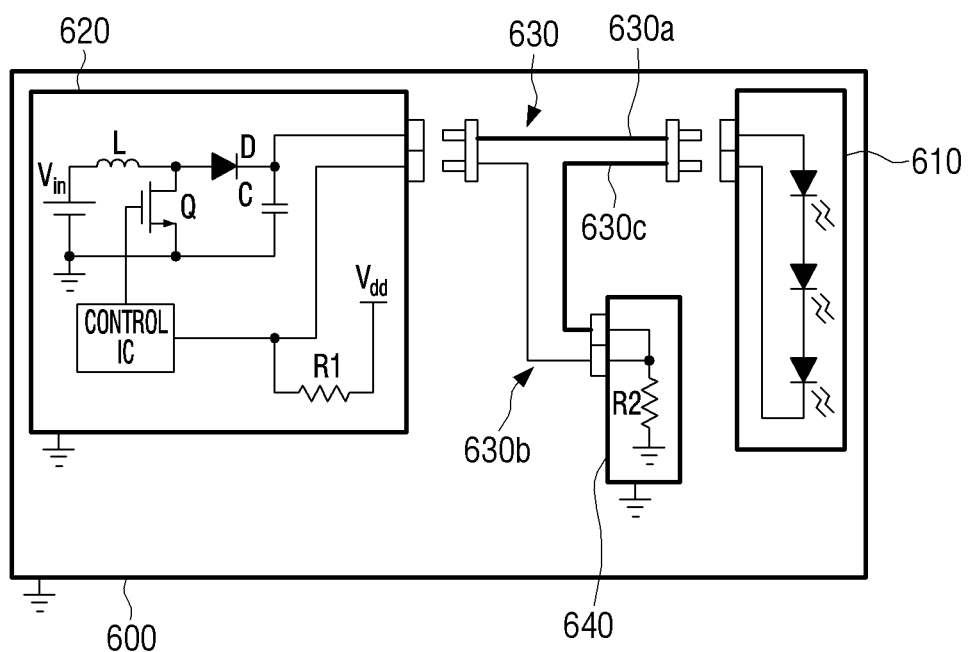
FIG. 6 is a block diagram illustrating the configuration of a display device according to a fifth embodiment of the present disclosure.

FIG. 6 is a block diagram illustrating the configuration of a display device according to a fifth embodiment of the present disclosure.

As illustrated in FIG. 6, a display device 590 according to a fifth embodiment of the present disclosure includes an external case 600, an LED module 610, an LED driving circuit (driver) 620, a power line 630, and a current detector 640.

As compared with the display device 290 of FIG. 3, the display device 590 of FIG. 6 has a changed structure of the power line 630 through separate configuration of the LEDs and the current detection resistor R2 in the LED module 310 of FIG. 3.

In other words, the power line 630 of FIG. 6 is different from the power line 330 on the point that the power line, that is, the shape of the second line 630*b*, that receives a feedback of the both-end voltage based on the current detection resistor 630*b* is different from the shape of other lines, that is, the first and third lines 630*a* and 630*c*. A board (e.g., third board) on which the current detector 640 is configured may be positioned on the rear surface of the external case 600.

Except for such points, the display device 590 of FIG. 6 is not greatly different from the display device 290 of FIG. 3, and thus the detailed explanation of the same contents will be omitted.

According to the embodiments of the present disclosure, the LED current detection resistor is formed in a place that is adjacent to the LED light source, and thus the thickness of the line that connects the LED driving circuit and the LED light source to each other can be reduced to save the manufacturing cost. Further, the pull-up resistor is added to the current detector of the LED driver to provide countermeasures against the connection inferiority of the feedback path that is formed by the cable. In addition, the current detection resistor that is one of primary heat generation component is independently provided to improve the quality, such as heat dissipation performance.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display device comprising:
    a cable including a first line and a second line;
    a light emitting unit including an LED array;
    a current detector connected between the LED array and a ground and configured to detect a current that flows through the LED array;
    a driving circuit configured to detect the current that flows through the LED array, using the current detector which is connected to the driving circuit through the first line and provide, through the second line, a constant current to the LED array based on the detected current; and
    a cover comprising a first board on which the LED array is formed and a second board on which the driving circuit is formed,
    wherein
        the first line is connected between a node, to which the LED array and the current detector are commonly connected, and the driving circuit,
        the second line is connected between the LED array and the driving circuit, and
        the first board and the second board are commonly connected to the ground of the cover.

2. The display device as claimed in claim 1, wherein the first line and the second line are of different types.

3. The display device as claimed in claim 2, wherein the different types of the first line and the second line comprise any one or a combination of:
    a line width of the first line different from a line width of the second line, and/or
    a shape of the first line different from a shape of the second line.

4. The display device as claimed in claim 1, wherein the current detector is formed on the first board on which the LED array is arranged.

5. The display device as claimed in claim 4, wherein the current detector comprises a resistor having:
    one end connected to the LED array, and
    another end connected to the ground.

6. The display device as claimed in claim 1, wherein the current detector is formed on a board other than the first board on which the LED array is arranged, the cable further comprises a third line to connect the current detector to the LED array.

7. The display device as claimed in claim 6, wherein the current detector comprises a resistor having:
   one end connected to the LED array through the third line and connected to the driving circuit through the second line, and
   another end connected to the ground.

8. The display device as claimed in claim 7, wherein the third line comprise any one or a combination of:
   a line width different from a line width of the second line, and/or
   a shape different from a shape of the second line.

9. The display device as claimed in claim 1, wherein the driving circuit comprises:
   a controller configured to control the driving circuit to provide the constant current to the LED array; and
   a stabilizer connected between a supply voltage terminal and the controller, and configured to stabilize an operation of the controller during an abnormal operation of the second line.

10. The display device as claimed in claim 9, wherein the stabilizer comprises a pull-up resistor.

11. The display device as claimed in claim 1, wherein the first line comprises a Flexible Flat Cable (FFC).

12. The display device as claimed in claim 1, wherein the LED array comprises at least one of red (R), green (G), blue (B), and/or white (W) light emitting elements.

\* \* \* \* \*